US007778461B2

(12) United States Patent
Shi et al.

(10) Patent No.: US 7,778,461 B2
(45) Date of Patent: Aug. 17, 2010

(54) SYSTEM AND/OR METHOD FOR IMAGE TAMPER DETECTION

(75) Inventors: Yun-Qing Shi, Millburn, NJ (US); Dongdong Fu, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1110 days.

(21) Appl. No.: 11/418,822

(22) Filed: May 5, 2006

(65) Prior Publication Data

US 2007/0258618 A1    Nov. 8, 2007

(51) Int. Cl.
*G06K 9/00*    (2006.01)
(52) U.S. Cl. .......................... 382/170; 348/91; 345/647
(58) Field of Classification Search ................. 382/100, 382/159, 160, 170, 181, 190, 195; 700/47, 700/8
See application file for complete search history.

(56) References Cited

OTHER PUBLICATIONS

Shi, Image steganalysis based on moments of characteristic functions using wavelet decomposition, prediction-error image, and neural network, Jul. 8, 2005, IEEE.*
Farid, "Detection of Digital Forgeries Using Bispectral Analysis," Technical Report, AIM-1657, MIT AI Memo, 1999.
Ng, Chang & Sun, "Blind Detection of Photomontage Using Higher Order Statistics" IEEE Int. Symp. Cir. and Sys., Vancouver, Canada, 2004.
Huang, Shen & Long, "The Empirical Mode Decomposition and the Hilbert Spectrum for Nonlinear and Non-Stationary Time Series Analysis," Proc. Royal Soc. of London, vol. A, No. 454, pp. 903-995, 1998.
Yang, Qi & Yang, "Signal Period Analysis Based on Hilbert-Huang Transform and Its Application to Texture Analysis," Int. Conf. Image and Graphic, Hong Kong, 2004.
Vese & Osher, "Modelling Textures with Total Variation Minimization and Oscillating Patterns in Image Processing," UCLA C.A.M. Rept., May 2-19, 2002.
Farid, "Detecting Hidding Messages Using Higher-Order Statistical Models," Proc. IEEE Int. Conf. Image Proc. 02, vol. 2, pp. 905-908.
Harmsen, "Steganalysis of Additive Noise Modelable Information Hiding," MS Thesis, RPI, Apr. 2003.
Leon-Garcia, Probability and Random Processes for Electrical Engineering, 2nd Ed., 1994, pp. 145-148.
"Steganalysis Based on Multiple Features Formed by Statistical Moments of Wavelet Characteristic Functions," Information Hiding Workshop, Barcelona, Spain, Jun. 2005.
Weinberger, Seroussi, & Sapiro, "LOCOI: A Low Complexity Context-Based Lossless Image Compression Algorithm," Proc. IEEE Data Compression Conf., 1996, pp. 140-149.

* cited by examiner

*Primary Examiner*—Anand Bhatnagar
(74) *Attorney, Agent, or Firm*—Connolly Bove Lodge & Hutz LLP

(57) ABSTRACT

The subject matter disclosed herein relates to techniques for detecting tampering of digital image data.

35 Claims, 1 Drawing Sheet

SYSTEM AND/OR METHOD FOR IMAGE TAMPER DETECTION

BACKGROUND

1. Field

The subject matter disclosed herein relates to digital image processing.

2. Information

Image tampering refers manipulation of image to change an appearance. Here, such tampering may comprise a malicious manipulation of an authentic image to mislead observers. The development of the digital imaging technology makes image tampering much easier than before. There is an increasing need to determine whether images have been tampered, especially for forensic purposes. Image splicing is one of the commonly used image tampering schemes, which may comprise joining two or more images together to construct a scene that actually never existed, for example. Following a splicing of an authentic image, additional processing is typically employed to make such a splicing more difficult to detect.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figures 1, 2:
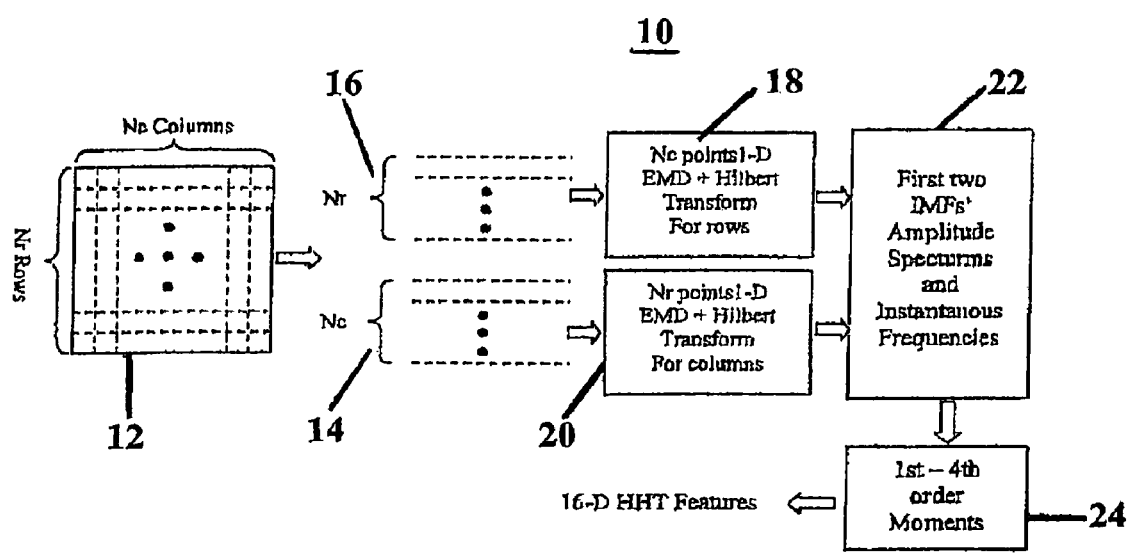
FIG. 1 is a schematic diagram of a system to process image data according to an embodiment.
FIG. 2 is a schematic diagram illustrating a prediction of a pixel value according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "classifying," "extracting," "detecting," "deriving," "inhibiting," "rendering," "downloading," "identifying," "initiating," "querying," "obtaining," "hosting," "maintaining," "representing," "modifying," "receiving," "transmitting," "transforming," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium. Further, unless specifically stated otherwise, processes described herein, with reference to flow diagrams or otherwise, may also be executed and/or controlled, in whole or in part, by such a computing platform.

"Image data" as referred to herein relates to information that is representative of all or a portion of an image. Such image data may be expressed, for example, in digital form as values stored in a storage medium, transient signals being transmitted in a data transmission medium and/or the like. Such image data may be used to reproduce all or a portion of an image in a viewable medium such as, for example, a printed medium, an electronic display and/or the like. However, these are merely examples of image data and claimed subject matter is not limited in these respects.

According to an embodiment, an authentic image may be "tampered" to change or otherwise distort the image. For example, such a tampering may comprise a modification of image data representing such an authentic image to provide image data representing an image that has a different appearance than that of the authentic image. However, this is merely an example of how an authentic image may be tampered and claimed subject matter is not limited in this respect.

According to an embodiment, one type of image tampering may comprising "splicing" in that an authentic image, as captured in a medium, is altered by, for example, by cropping and/or superimposing different, other images to alter the appearance of the authentic image. In one particular embodiment, such a splicing may comprise altering image data representing an authentic image to represent a spliced image. However, this is merely an example of how an image may be spliced and claimed subject matter is not limited in these respects.

According to an embodiment, image data representing an image may be processed in order to classify the image into one or more classifications. For example, algorithmic techniques may be applied to image data to generate classification features. Using statistical techniques, for example, images may be classified into one or more classifications based, at least in part, on such generated classification features. According to an embodiment, although claimed subject matter is not limited in this respect, image data may be processed according to a Hilbert-Huang Transform (HHT) for generating classification features for use in determining whether an image has been tampered.

According to an embodiment, although claimed subject matter is not limited in this respect, an image may be classified using an approach that extracts features associated with an image, followed by a process to classify the image into one or more classifications based, at least in part, on extracted features. Such an extraction of features may comprise, for example, associating multi-dimensional points or vectors with an image based, at least in part, on image data associated with the image. Such image data may comprise, for example, multi-color values and/or grayscale values associated with particular pixels in an image. However, this is merely an example of image data that may be used for extracting features for use in classification of an image and claimed subject matter is not limited in this respect.

In one embodiment, although claimed subject matter is not limited in this respect, an image may be classified based upon associated classification features using a machine learning and/or pattern recognition system such as, for example, a neural network or a support vector machine (SVM). Here, for example, such a machine learning and/or pattern recognition system may evaluate classification features of test or training images that are a priori determined to be members of particular classes of interest. Following such a sequence of evaluating classification features of test or training images, the machine learning and/or pattern recognition system may be used for classification of other images. However, this is merely an example of systems that may be used for the classification of images based, at least in part, on classification features, and claimed subject matter is not limited in this respect.

According to an embodiment, detection of image tampering may set forth a two-class classification problem under a pattern recognition framework. Here, for example, a given image may be classified as authentic or tampered (e.g., spliced) depending on the classification of representative features extracted from the image. Such a detection may be made by generating appropriate features from image data. In a particular embodiment, since a portion of a spliced image actually comprises part of an authentic image, modeling the image splicing process proves challenging. Furthermore, images are generally considered non-stationary in nature, which may make the detection problem even harder. Here, such non-stationary properties may relate to variations in statistics from one image to the next, adding to complexity associated with developing robust adaptive pattern recognition systems.

As illustrated by H. Farid in "Detection Digital Forgeries Using Bispectral Analysis", Technical Report, AIM-1657, MIT AI Memo, 1999, speech signal splicing is considered as a highly non-linear process and thus higher order spectral analysis, specifically bicoherence, is introduced to deal with this problem. As illustrated by T.-T. Ng, S.-F. Chang and Q. Sun in "Blind Detection of Photomontage Using Higher Order Statistics," *IEEE International Symposium on Circuits and Systems*, Vancouver, Canada, May 23-26, 2004 (hereinafter "[1]"), this scheme may be extended into image splicing detection. However, the method presented in [1] provides a success rate of 71.5% in detection accuracy on an image database of more than 1800 images. According to an embodiment, a newly developed Hilbert-Huang Transform (HHT) may be used to generate pattern recognition features for the detection of image splicing that may provide better results in some circumstances. In another embodiment, statistical moments of characteristic functions of a prediction-error image, test image, and their wavelet subbands may be selected as features for the detection of image splicing. As illustrated below, experimental results have shown that, in particular cases, such techniques may outperform methods presented in [1] and in Columbia DVMM Research Lab. (2004) Columbia Image Splicing Detection Evaluation Dataset, http://www.ee.columbia.edu/dvmm/research-Projects/Authentication Watermarking/BlindImageVideoforensic/.

Hilbert-Huang Transform (HHT)

As illustrated by N. E. Huang, Z. Shen and S. R. Long in "The empirical mode decomposition and the Hilbert spectrum for nonlinear and non-stationary time series analysis", *Proceedings of the Royal Society of London*, vol. A, no. 454, pp. 903-995, 1998, HHT technology may be used to analyze time-varying processes. According to a particular embodiment, and as discussed below, HHT is especially suitable for analyzing nonlinear and non-stationary signals such as in a process of detecting image splicing.

In HHT, a signal may firstly be decomposed into intrinsic mode functions (IMFs) by empirical mode decomposition (EMD). Hilbert spectral analysis may then be applied to extract characteristics of the IMFs. Instead of using fixed basis functions as used in fast Fourier transforms (FFTs) and discrete cosine transforms (DCTs), the HHT may adaptively derive its basis functions from the signal itself. Therefore, HHT demonstrates excellent performance in analyzing non-linear non-stationary signals.

According to an embodiment, an intrinsic mode function (IMF) comprises a function that satisfies the following two conditions:

(1) in the whole data set, the number of extrema and the number of zero crossings either equal or differ at most by one; and (2) at any point, a mean value of an envelope defined by the local maxima and the envelope defined by the local minima is zero.

After decomposition of a signal, decomposed data may be reduced to several IMF components. Hilbert transform may then be performed on individual IMF components. For a given arbitrary signal x(t), the Hilbert transform of such an arbitrary signal, according to a particular embodiment, can be expressed in relation (1) as follows:

$$y(t) = \frac{1}{\pi} P \int_{-\infty}^{\infty} \frac{x(t')}{t-t'} dt' \qquad (1)$$

where P indicates a Cauchy principal value. With this definition, according to a particular embodiment, x(t) and y(t) may be used to define an analytic signal z(t) as expressed in relation (2) as follows:

$$z(t)=x(t)+iy(t)=a(t)e^{i\theta(t)} \qquad (2)$$

where, $$a(t) = [x^2(t) + y^2(t)]^{1/2} \text{ and } \theta(t) = \arctan\left(\frac{y(t)}{x(t)}\right)$$

comprise the amplitude and phase of this analytical signal, respectively. Furthermore, an instantaneous frequency ω may be defined according to a particular embodiment as in relation (3) as follows:

$$\omega = \frac{d\theta(t)}{dt}. \quad (3)$$

The Hilbert transform enables a representation of amplitude and instantaneous frequency as functions of time. This frequency-time distribution of the amplitude may be designated as a Hilbert amplitude spectrum. The frequency in the Hilbert amplitude spectrum may indicate that an oscillation with such a frequency exists.

Feature Generation

Features Based on HHT

As described above, an image splicing process may behave as a nonlinear process, and HHT provides a method of capturing characteristics of such a nonlinear and no-stationary process. Here, the HHT may be used to generate features for classification. Such HHT features may be generated by employing 1-D HHT as illustrated in FIG. 1. Here, image data 12 may comprise a two-dimensional array to represent, for example, values associated with pixel locations of an image. Here, such values may represent, for example, grayscale values or multi-color vectors. As such, image data 12 may be partitioned into Nr rows and Nc columns as shown. A 1-D HHT may then be performed on individual rows 16 of image data 12 to provide associated transformations 18 associated with rows. Similarly, a 1-D HHT may be performed on individual columns 14 of image data 12 to provide transformations 20 associated with columns. IMFs and Hilbert spectrums for individual rows and columns may then be obtained.

It has been shown by Z. Yang, D. Qi, and L. Yang in "Signal Period Analysis Based on Hilbert-Huang Transform and Its Application to Texture Analysis", *Intl. Conf. Image and Graphic*, Hong Kong, 2004 that, after taken by EMD, a nonlinear distortion of a signal may be mainly distributed into the IMFs of higher frequency components without significantly affecting IMFs of lower frequency. In a particular embodiment, features may be constructed using only amplitudes and instantaneous frequencies 22 of the first two highest frequency IMFs, for example. Here, in a particular embodiment, by extracting the $1^{st}$ to $4^{th}$ order moments 24 for amplitude spectrum and instantaneous frequency, there 16-D features may be generated.

As illustrated in [1], an image may be decomposed into a structure component and a fine texture component by using a decomposition method proposed by L. A. Vese and S. J. Osher in "Modeling textures with total variation minimization and oscillating patterns in image processing", UCLA C.A.M. Report, 2-19, May 2002. According to a particular embodiment, such a decomposition may be made by solving the following total variation minimization problem set forth in relation (4) as follows:

$$\inf_{u} \left\{ E(u) = \int_{\Omega} |\nabla u| + \lambda \|v\|_*, \; f = u + v \right\} \quad (4)$$

where f denotes an original image, u denotes a structure component of the image and v denotes a fine texture component of the image. However, this is merely an example of how structure and fine texture components of an image may be derived and claimed subject matter is not limited in this respect.

As the image splicing process typically causes abnormalities at the edges between the objects to be spliced, fine texture component v can be expected to be indicative of this kind of abnormality while the structure component u may be can be expected to represent the authentic image. To evaluate these properties of the structure and fine texture components, HHT may be used to generate additional features following steps illustrated above with reference to FIG. 1. That is, according to a particular embodiment for texture component v, 16-D HHT features may be generated. There may also be 16-D HHT features generated for structure component u.

In a particular embodiment, although claimed subject matter is not limited in this respect, classification may performed based, at least in part, on a prediction of an authentic image based, at least in part, on the 16-D HHT features generated for structure component u. Here, such features may be used-to predict the authentic image features as illustrated in [1], for example. According to an embodiment, 16-D prediction errors may be used as features for final classification.

In summary, the final classification features generation procedure may be described as follows according to a particular embodiment:

(1) For a given image f, calculate its 16-D HHT features.
(2) Decompose f into a structure component u and a fine texture component v.
(3) Calculate the 16-D HHT features of v.
(4) Calculate the 16-D HHT features of u.
(5) Predict the original HHT features by the HHT features of u. The prediction errors are then used for the classification.
(6) Combine the HHT features of the original image, the HHT features of the fine texture component v and the prediction error features together. Here, in a particular embodiment, we obtain 48-D features for classification.

It should be understood, however, that this is merely an example of classification features that may be used in determining whether an image is to be classified as either an authentic image or a tampered image using, for example, a machine learning and/or pattern recognition system as illustrated above. For example, other embodiments may employ only a subset of the classification features identified above while other embodiments may include at least some of the classification features identified above in combination with other classification features. Again, these are merely examples of classification features that may be used in classifying whether an image is authentic or tampered, and claimed subject matter is not limited in this respect.

In one particular embodiment, classification features according to moments of characteristic functions using wavelet decomposition may be used in combination with or in lieu of the 48-D features discussed above.

Features Based on Moments of Characteristic Functions Using Wavelet Decomposition In another embodiment, statistical moments of characteristic functions of a prediction-error image, test image, and/or their wavelet subbands may be selected as features for the detection of image splicing in lieu of or in addition to the use of features extracted using HHT as illustrated above. In a particular embodiment of detecting image tampering and/or splicing, up to 78-D features from this analysis may be used in lieu of or in addition to 48-D features discussed above, resulting in 126-D features.

In "Detecting hidden messages using higher-order statistical models," *Proceedings of the IEEE Int'l. Conf. on Image Processing* 02, vol. 2, pp. 905~908 (hereinafter "[2]"), H. Farid proposes a method for generating image features for analysis based on high order statistics. These statistics may be based on decomposition of images with separable quadrature mirror filters. Here, subbands' high order statistics may be obtained as features for detecting tampering. This method may differentiate tampered images from authentic images with a certain success rate. In *Steganalysis of Additive Noise Modelable Information Hiding*, MS thesis, Rensselaer Polytechnic Institute, NY, thesis advisor William Pearlman, April 2003 (hereinafter "[3]"), J. Harmsen proposes a method of analyzing statistics of image data based on the mass center (the first order moment) of histogram characteristic function. Second and third order moments may also be considered for detecting tampering such as splicing. Compared with the method illustrated in [2], its performance has been improved for detection of stego images generated by spread spectrum data embedding. However, the performance achieved by [3] may be limited by using a limited number (three) of features extracted from a test image.

It is well-known that an image's histogram typically comprises a probability mass function (pmf) of the image (only differing by a scalar). Multiplying components of the pmf by a correspondingly shifted unit impulse may result in a probability density function (pdf). In the context of discrete Fourier transform (DFT), unit impulses can be ignored, implying that pmf and pdf are exchangeable. Thus, the pdf can be thought as a normalized version of a histogram. One interpretation of a characteristic function (CF), as proposed by A. Leon-Garcia in *Probability and Random Processes for Electrical Engineering*, $2^{nd}$ Edition, Reading, Mass.: Addison-Wesley Publishing Company, 1994, pp. 145-148, a CF may comprise a Fourier transform of the pdf (with a reversal in the sign of the exponent).

Owing to the decorrelation capability of a discrete wavelet transform (DWT), coefficients of different subbands at the same level may be weakly correlated to one another. Therefore, the features generated from different wavelet subbands at the same level may be less correlated to one another. This property may be desirable for pattern classification as illustrated by Y. Q. Shi, G. Xuan, D. Zou, J. Gao, C. Yang, Z. Zhang, P. Chai, W. Chen, C. Chen in "Steganalysis based on moments of characteristic functions using wavelet decomposition, prediction-error image, and neural network," *IEEE International Conference on Multimedia and Expo*, Amsterdam, Netherlands, July, 2005 (hereinafter "[4]"), and in "Steganalysis Based on multiple features formed by statistical moments of wavelet characteristic functions," *Information Hiding Workshop*, Barcelona, Spain, June 2005 (hereinafter "[5]").

According to an embodiment, statistical moments of the CFs of both a test image and its wavelet subbands may be used as features for detecting tampering, which are defined according to relation (5) as follows:

$$M_n = \sum_{j=1}^{(N/2)} f_j^n |H(f_j)| \bigg/ \sum_{j=1}^{(N/2)} |H(f_j)| \quad (5)$$

where $H(f_i)$ comprises a CF component at frequency $f_i$, N is the total number of points in the horizontal axis of a histogram. In this particular illustration, a zero frequency component of the CF, i.e., $H(f_0)$, has been excluded in the calculation of moments because it represents only a summation of components in the discrete histogram. For an image, this may comprise the total number of pixels. For a wavelet subband, this may comprise the total number of the coefficients in the subband.

According to an embodiment, a histogram may be denoted by h(x) and comprise an inverse Fourier transform (in the above-mentioned sense) of the CF, H(f). Accordingly, relation (6) may provide as follows:

$$\left| \left( \frac{d^n}{dx^n} h(x) \right) \bigg|_{x=0} \right| = \left| (-j2\pi)^n \int_{-\infty}^{\infty} f^n H(f) \, df \right| \leq 2(2\pi)^n \int_{0}^{\infty} f^n |H(f)| \, df \quad (6)$$

This is to say that the magnitude of the n-th derivative of the histogram at x=0 may be upper bounded by the n-th moments of the CF multiplied by a scalar quantity (simply stated below as "upper bounded by the n-th moments of the CF"). Using a Fourier translation property, it can be shown that this upper bound is also valid for x≠0.

According to an embodiment, noise introduced by tampering (e.g., from splicing) may be modeled as additive, Gaussian distributed, and independent of an authentic image. It may then follow that a magnitude of a DFT sequence of the noise caused by tampering may be non-increasing. Here, a sequence of the magnitude of CF is non-negative. Using the discrete Chebyshev inequality illustrated in [2] and by D. S. Mitrinovic, J. E. Pecaric and A. M. Fink in *Classical and New Inequalities in Analysis*, Dordrecht, The Netherlands: Kluwer Academic Publishers, 1993, it can be shown that moments defined in relation (5) may be non-increasing after tampering. Combining the above two results, one can derive that the upper bound of the magnitude of the n-th derivative of the histogram will not increase after tampering.

According to an embodiment, detection of tampering may be particularly focused on distortion caused by splicing. This type of distortion may be weak and hence covered by other types of noises, including those due to peculiar features of the image itself. In order to enhance the noise introduced by tampering in a particular embodiment, pixel grayscale values in an original authentic image may be predicted by using its neighboring pixels' grayscale values, and obtain a prediction-error image by subtracting the predicted image from a test image. Here, such a prediction-error image may remove various information other than that caused by tampering, thus making detection of tampering more efficient. As illustrated by M. Weinberger, G. Seroussi, and G. Sapiro in "LOCOI: A low complexity context-based lossless image compression algorithm," *Proc. of IEEE Data Compression Conf.* 1996, pp. 140-149, such a prediction algorithm, according to a particular embodiment, may be expressed below according to relation (7) as follows:

$$\hat{x} = \begin{cases} \max(a, b) & c \leq \min(a, b) \\ \min(a, b) & c \geq \max(a, b) \\ a + b - c & \text{otherwise} \end{cases} \quad (7)$$

where a, b, c comprise a context of a pixel x under consideration, and $\hat{x}$ is the prediction value of x. The location of a, b, c can be illustrated in FIG. 2.

According to an embodiment, a test image may be decomposed using a three-level Haar transform. A level may comprise four subbands, resulting in 12 subbands in total. If an authentic image is considered as level-0 LL subband, we have a total of 13 subbands. For an associated subband, the first three moments of characteristic functions may be derived according to relation (5), resulting in a set of 39 features. Similarly, for the prediction-error image, another set of 39 features can be generated. Thus, a 78-D feature vector may be produced for a test image as illustrated in [4] and [5].

Experimental Results

Here an image database as used in [1] to illustrate techniques illustrated above. Among 912 authentic images and 912 spliced images, 760 were randomly selected for training while the remaining 152 were left for testing. A support vector machine (SVM) with polynomial kernel was used as classifier. Average test results over 20 random experiments are listed in Table 1 below, where TN stands for true negative, TP stands for true positive, and accuracy is the average of TN and TP. As indicated above, the detection rate reported in [1] by using features extracted from incoherence is 71.5%. The results are show for the generation of a 48-D feature vector using an HHT, a 78-D using statistical moments of characteristic functions of a prediction-error image, test image, and their wavelet subbands, and a combination of 78-D and 48-D feature vectors.

TABLE 1

| Features | TN | TP | Accuracy |
|---|---|---|---|
| 78-D | 78.22% | 74.34% | 76.28% |
| 48- | 72.70% | 79.34% | 76.02% |
| 78-D + 48-D | 79.74% | 81.25% | 80.49% |

It should also be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method comprising:
   representing an image as image data; and
   detecting, by a processing system, a tampering in said image based, at least in part, on classification features generated based, at least in part, on said image data according to a Hilbert-Huang transformation.

2. The method of claim 1, wherein said detecting said tampering further comprises:
   extracting a structure component from said image data;
   deriving one or more intrinsic mode functions from said structure component; and
   detecting said tampering in said image based, at least in part, on said one or more intrinsic mode functions derived from said structure component.

3. The method of claim 2, wherein said detecting said tampering further comprises:
   predicting features of said image based, at least in part, on said one or more intrinsic mode functions derived from said structure component; and
   comparing said predicted features with actual features of said image to determine an error.

4. The method of claim 1, and further comprising generating said classification features based, at least in part, on one or more intrinsic mode functions derived from a fine texture component extracted from said image data.

5. The method of claim 1, and further comprising generating said classification features based, at least in part, on one or more intrinsic mode functions derived from image data representing an authentic image.

6. The method of claim 1, wherein said image data comprises an array including a plurality of rows and a plurality of columns, the method further comprising generating said classification features based, at least in part, on 1-D Hilbert-Huang transforms of individual rows to provide associated IMFs and Hilbert spectrums associated with said individual rows.

7. The method of claim 6, the method further comprising generating said classification features based, at least in part, on 1-D Hilbert-Huang transforms of individual columns to provide associated IMFs and Hilbert spectrums associated with said individual columns.

8. The method of claim 7, wherein said generating said classification features further comprises generating 16-D features based, at least in part, on said IMFs and Hilbert spectrums associated with said individual rows and columns.

9. The method of claim 1, and further comprising detecting said tampering in said image based, at least in part, on classification features generated based, at least in part, on statistical moments of characteristic functions of a prediction-error image, test image, and associated wavelet subbands.

10. The method of claim 1, wherein said tampering comprises one or more splices in said image.

11. The method of claim 1, further comprising:
    deriving one or more sets of classification features based on a set of test image data, the classification features generated at least in part based on a Hilbert-Huang transformation; and
    training a classifier to perform said detecting based on the one or more sets of classification features.

12. An apparatus comprising:
    a computing platform, said computing platform being configured to:
    represent an image as image data; and
    detect a tampering in said image based, at least in part, on classification features generated based, at least in part, on said image data according to a Hilbert-Huang transformation.

13. The apparatus of claim 12, wherein said computing platform is further adapted to:
    extract a structure component from said image data;
    derive one or more intrinsic mode functions from said structure component; and
    detect said tampering in said image based, at least in part, on said one or more intrinsic mode functions derived from said structure component.

14. The apparatus of claim 13, wherein said computing platform is further adapted to:
predict features of said image based, at least in part, on said one or more intrinsic mode functions derived from said structure component; and
compare said predicted features with actual features of said image to determine an error.

15. The apparatus of claim 12, wherein said computing platform is further adapted to generate said classification features based, at least in part, on one or more intrinsic mode functions derived from a fine texture component extracted from said image data.

16. The apparatus of claim 12, wherein said computing platform is further adapted to generate said classification features based, at least in part, on one or more intrinsic mode functions derived from image data representing an original image.

17. The apparatus of claim 12, wherein said image data comprises an array including a plurality of rows and a plurality of columns, and wherein said computing platform is further adapted to generate said classification features based, at least in part, on one or more 1-D Hilbert-Huang transforms of individual rows to provide associated IMFs and Hilbert spectrums associated with said individual rows.

18. The apparatus of claim 17, wherein said computing platform is further adapted to generate said classification features based, at least in part, on one or more 1-D Hilbert-Huang transforms of individual columns to provide associated IMFs and Hilbert spectrums associated with said individual columns.

19. The apparatus of claim 18, wherein said computing platform is further adapted to generate 16-D features based, at least in part, on said IMFs and Hilbert spectrums associated with said individual rows and columns.

20. The apparatus of claim 12, wherein said computing platform is further adapted to detect said tampering in said image based, at least in part, on classification features generated based, at least in part, on statistical moments of characteristic functions of a prediction-error image, test image, and associated wavelet subbands.

21. The apparatus of claim 12, wherein said tampering comprises one or more splices in said image.

22. The apparatus of claim 12, further comprising:
an image classifier to detect said tampering, the image classifier configured to receive classification features generated from a set of test image data, the classification features derived at least in part based on a Hilbert-Huang transformation, and to transform its configuration based on the classifications.

23. The apparatus of claim 12, wherein said computing platform comprises one or more processors.

24. The apparatus of claim 12, further comprising a reception device configured to receive the image.

25. An article of manufacture including:
a storage medium having machine-readable instructions stored thereon, the instructions comprising:
instructions for representing an image as image data; and
instructions for detecting tampering in said image based, at least in part, on classification features generated based, at least in part, on said image data according to a Hilbert-Huang transformation.

26. The article of claim 25, wherein the instructions further comprise:
instructions for extracting a structure component from said image data;
instructions for deriving one or more intrinsic-mode functions from said structure component; and
instructions for detecting said tampering in said image based, at least in part, on said one or more intrinsic mode functions derived from said structure component.

27. The article of claim 26, wherein the instructions further comprise:
instructions for predicting features of said image based, at least in part, on said one or more intrinsic mode functions derived from said structure component; and
instructions for comparing said predicted features with actual features of said image to determine an error.

28. The article of claim 25, wherein the instructions further comprise:
instructions for generating said classification features based, at least in part, on one or more intrinsic mode functions derived from a fine texture component extracted from said image data.

29. The article of claim 25, wherein the instructions further comprise:
instructions for generating said classification features based, at least in part, on one or more intrinsic mode functions derived from image data representing an original image.

30. The article of claim 25, wherein said image data comprises an array including a plurality of rows and a plurality of columns, and wherein the instructions further comprise:
instructions for generating said classification features based, at least in part, on one or more 1-D Hilbert-Huang transforms of individual rows to provide associated IMFs and Hilbert spectrums associated with said individual rows.

31. The article of claim 30, wherein the instructions further comprise:
instructions for generating said classification features based, at least in part, on one or more 1-D Hilbert-Huang transforms of individual columns to provide associated IMFs and Hilbert spectrums associated with said individual columns.

32. The article of claim 31, wherein the instructions further comprise:
instructions for generating 16-D features based, at least in part, on said IMFs and Hilbert spectrums associated with said individual rows and columns.

33. The article of claim 25, wherein the instructions further comprise:
instructions for detecting said tampering in said image based, at least in part, on classification features generated based, at least in part, on statistical moments of characteristic functions of a prediction-error image, test image, and associated wavelet subbands.

34. The article of claim 25, wherein said tampering comprises one or more splices in said image.

35. An apparatus comprising:
means for representing an image as image data; and
means for detecting a tampering in said image based, at least in part, on classification features generated based, at least in part, on said image data according to a Hilbert-Huang transformation.

* * * * *